(12) United States Patent
Zhang et al.

(10) Patent No.: US 9,078,059 B2
(45) Date of Patent: Jul. 7, 2015

(54) TRANSDUCER

(71) Applicant: Jabil Circuit (Beijing) LTD., Beijing (CN)

(72) Inventors: Jiliang Zhang, Beijing (CN); Xiaofei Wang, Beijing (CN); Mengxia Wang, Beijing (CN)

(73) Assignee: Jabil Circuit (Beijing), Ltd., Beijing (CN)

( * ) Notice: Subject to any disclaimer, the term of this patent is extended or adjusted under 35 U.S.C. 154(b) by 134 days.

(21) Appl. No.: 13/953,347

(22) Filed: Jul. 29, 2013

(65) Prior Publication Data

US 2014/0044301 A1   Feb. 13, 2014

Related U.S. Application Data

(60) Provisional application No. 61/680,451, filed on Aug. 7, 2012.

(51) Int. Cl.
  *H04R 1/02*   (2006.01)
  *H04R 9/02*   (2006.01)
  *H04R 9/06*   (2006.01)

(52) U.S. Cl.
  CPC .. *H04R 1/02* (2013.01); *H04R 9/06* (2013.01); *H04R 9/025* (2013.01); *H04R 2400/03* (2013.01); *H04R 2499/11* (2013.01)

(58) Field of Classification Search
  USPC ......... 381/386, 388, 306, 333, 301, 334, 396, 381/394, 389
  See application file for complete search history.

(56) References Cited

U.S. PATENT DOCUMENTS 5,764,784 A * 6/1998 Sato et al. ............... 381/412
  2012/0243719 A1* 9/2012 Franklin et al. .......... 381/333

* cited by examiner

*Primary Examiner* — Curtis Kuntz
*Assistant Examiner* — Sunita Joshi
(74) *Attorney, Agent, or Firm* — Volpe and Koenig, P.C.

(57) ABSTRACT

A transducer includes a housing, a magnet unit, an elastic diaphragm, a vibration unit, and a coil. The housing has a first housing and a second housing to form a storing space. The magnet unit is secured in the first housing. The elastic diaphragm is a thin layer and disposed between the second housing and the vibration unit. The spiral coil is mounted on the vibration unit and has two electrical connecting points for inputting electric signal of alternating current. Hence, the coil can generate continuous vibration caused by alternating attraction/repelling force of the magnet unit. When the frequency of the electric signal is within 20~20000 Hz, the elastic diaphragm generates sound signals within earshot. When it is within 10~20 Hz, it can generate vibration signals. So, signal unit can produce sound and vibration. In addition, it saves space for effectuating the thickness minimization of a product.

18 Claims, 8 Drawing Sheets

TRANSDUCER

CROSS-REFERENCE TO RELATED APPLICATIONS

The present application claims the priority of U.S. provisional patent application Ser. No. 61/680,451 filed Aug. 7, 2012, entitled "Transducer" and is incorporated herein in its entirety.

BACKGROUND OF THE INVENTION

1. Field of the Invention

The present invention relates to a transducer. Particularly, it relates to a transducer with a signal unit that can produce sound and vibration as well as it can save space for effectuating the thickness minimization of a product.

2. Description of the Prior Art

Figure 6:
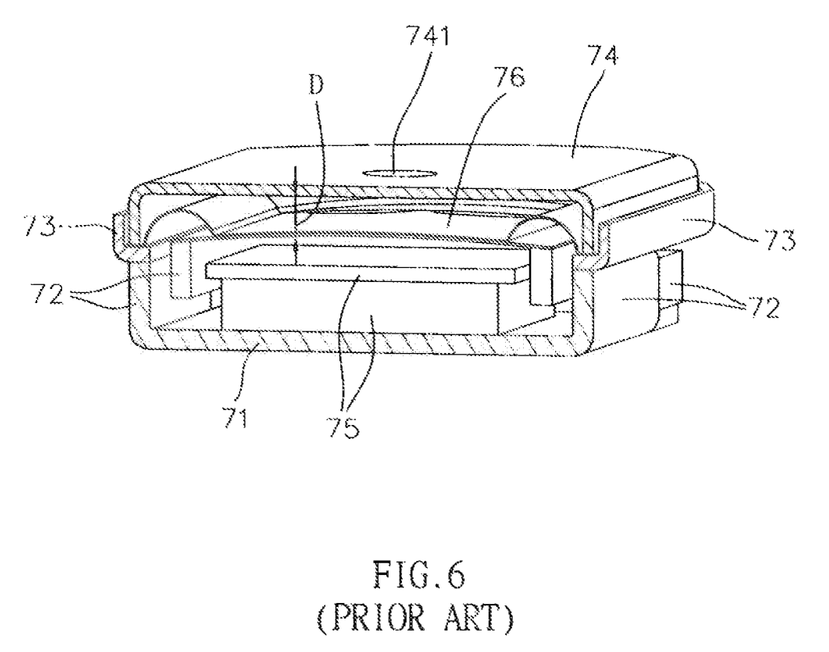
FIG. 6 is a view showing the first traditional device.

There are various traditional transducers that can achieve the electro-acoustic converting function. For example, FIG. 6 exhibits a micro transducer. It includes:

a magnetic common base 71;
two external magnets 72 vertically disposed on two side of the magnetic common base 71;
a pair of magnetic plates 73 connecting with these two external magnets 72;
a cover 74 disposed on the magnetic plates 73 with a sound hole 741;
an internal magnet 75 secured on the magnetic common base 71; and
a polymer diaphragm 76 mounted between the cover 74 and the internal magnet 75.

There is a gap D disposed between the polymer diaphragm 76 and the cover 74 for allowing vibration movement. Because the polymer diaphragm 76 and the cover 74 cannot be combined into one integral unit since gap D is required, it is not suitable for a product with an ultra-thin thickness.

Figure 7:
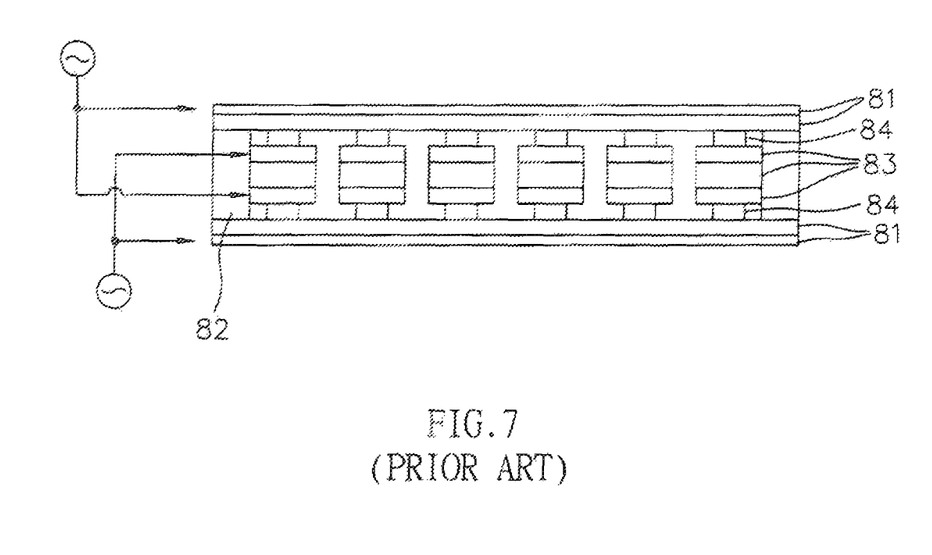
FIG. 7 is a view showing the second traditional device.

FIG. 7 illustrates the second type of the traditional electronic device with an electric sound transducer. It includes:

two electricity-stopping vibration diaphragms 81;
a main body 82 disposed between these two electricity-stopping vibration diaphragms 81;
at least one perforated board 83 (with a plurality of holes) disposed between two electricity-stopping vibration diaphragms 81; and
many partitions 84 disposed between the perforated board 83 and the electricity-stopping vibration diaphragm 81.

For a similar reason as mentioned previously, these electricity stopping vibration diaphragms 81 have to be separated from the perforated board 83. By virtue of this thickness limitation about the partitions 84, the product thickness cannot be minimized. So, it is not suitable for an ultra-thin product.

Figure 8:
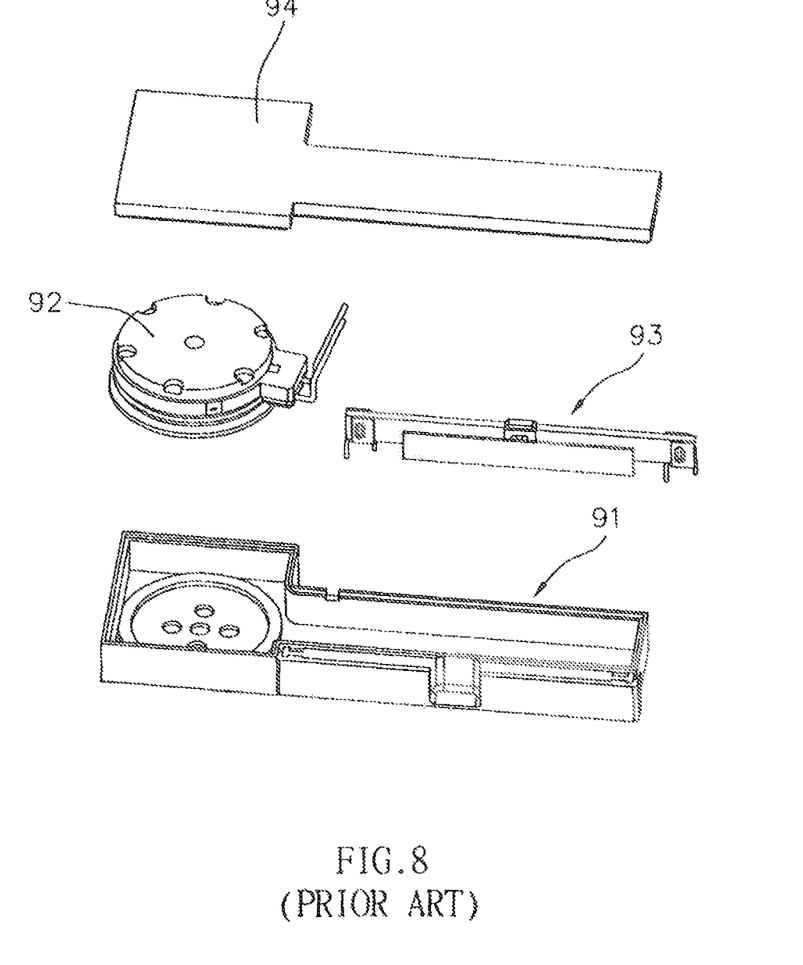
FIG. 8 is a view showing the third traditional device.

As shown in FIG. 8, the third traditional transducer includes:

a housing 91;
a speaker 92 that can be installed in the housing 91;
a piezoelectric vibrator 93 disposed on the housing 91; and
an upper cover 94 that can be covered on the housing 91.

Regarding this device, the speaker 92 and the piezoelectric vibrator 93 are two independent elements or units. Hence, it causes the volume consuming problem. The speaker 92 and the housing 91 cannot be combined together. It also occupies certain volume. As a result, it still cannot apply to the ultra-thin product.

SUMMARY OF THE INVENTION

The object of the present invention is to provide a transducer that can utilize a signal unit to produce sound and vibration as well as it can save space for effectuating the thickness minimization of a product. Particularly, it can solve the problems of traditional transducers such as: the inability to combine the speaker and the vibrator, that a certain gap is required that occupies too much space, etc.

In order to achieve the above-mentioned object, this invention is provided as a technical solution. In one embodiment of the invention, a transducer comprises:

a housing unit having a first housing and a second housing, the first housing and the second housing being connected together so as to form a hollow structure having a storing space, the first housing having a first inner surface and a first outer surface, the second housing having an opening;
a magnet unit being mounted on the first inner surface of the housing;
an elastic diaphragm having an outer edge and an inner edge; the outer edge being secured on the opening of the second housing;
a vibrating unit being secured on the inner edge of the elastic diaphragm; and
a coil being secured on the vibrating unit, the coil having two electric connecting points for inputting an electric signal.

DETAILED DESCRIPTION OF THE PREFERRED EMBODIMENT

Figure 1:
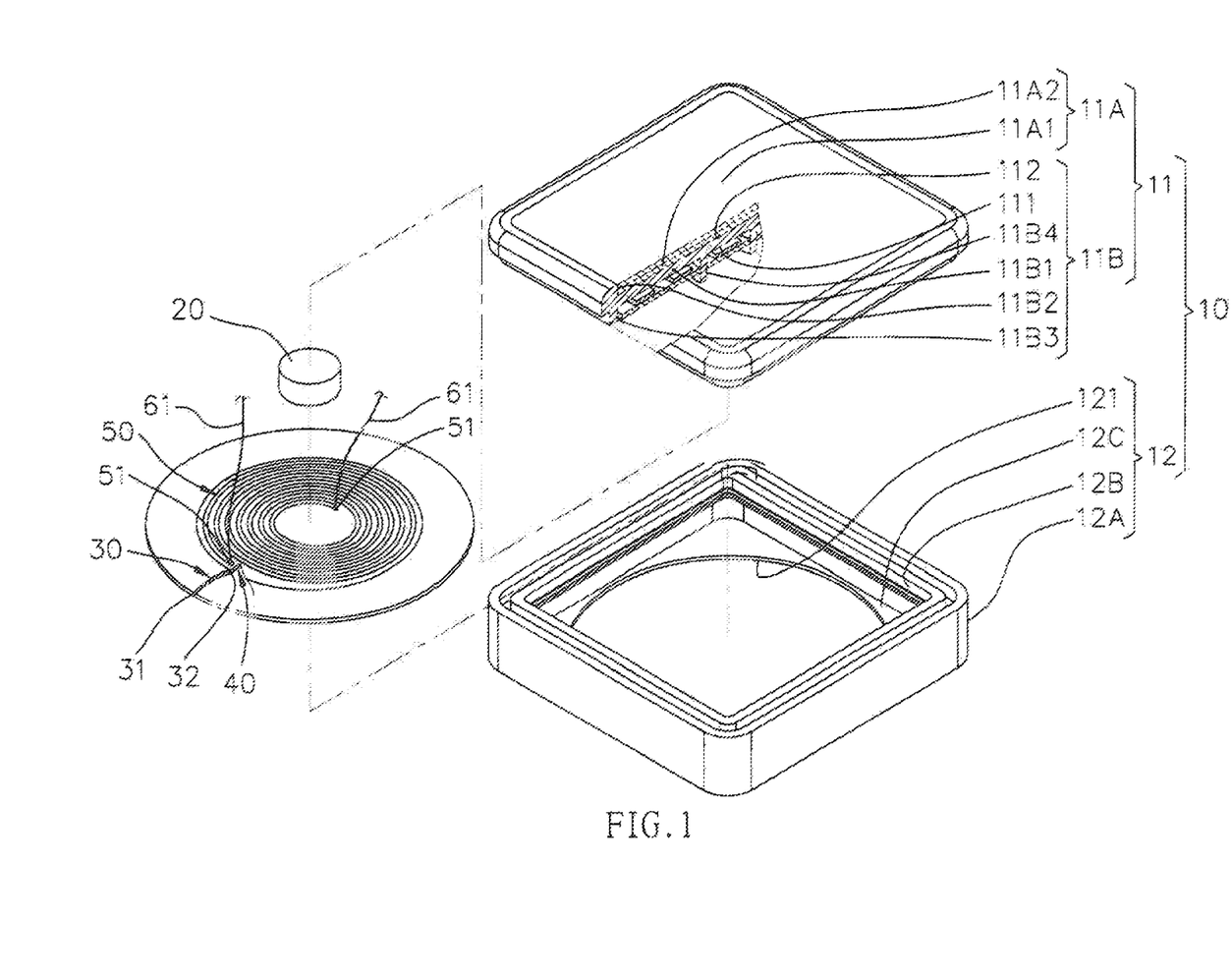
FIG. 1 is an exploded view of the present invention.
Figure 2:
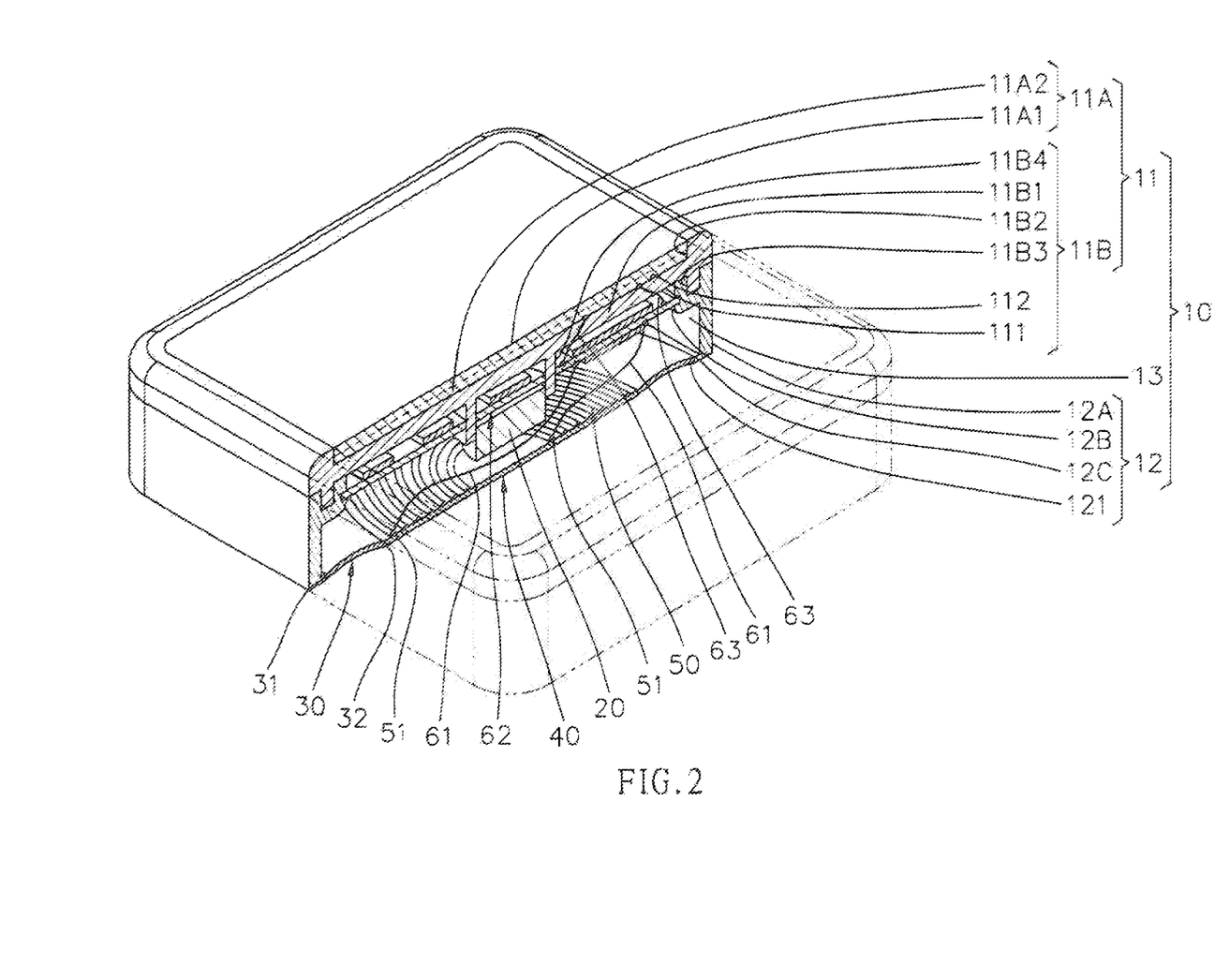
FIG. 2 is a view illustrating the inner structure of the present invention when it is assembled.
Figure 3:
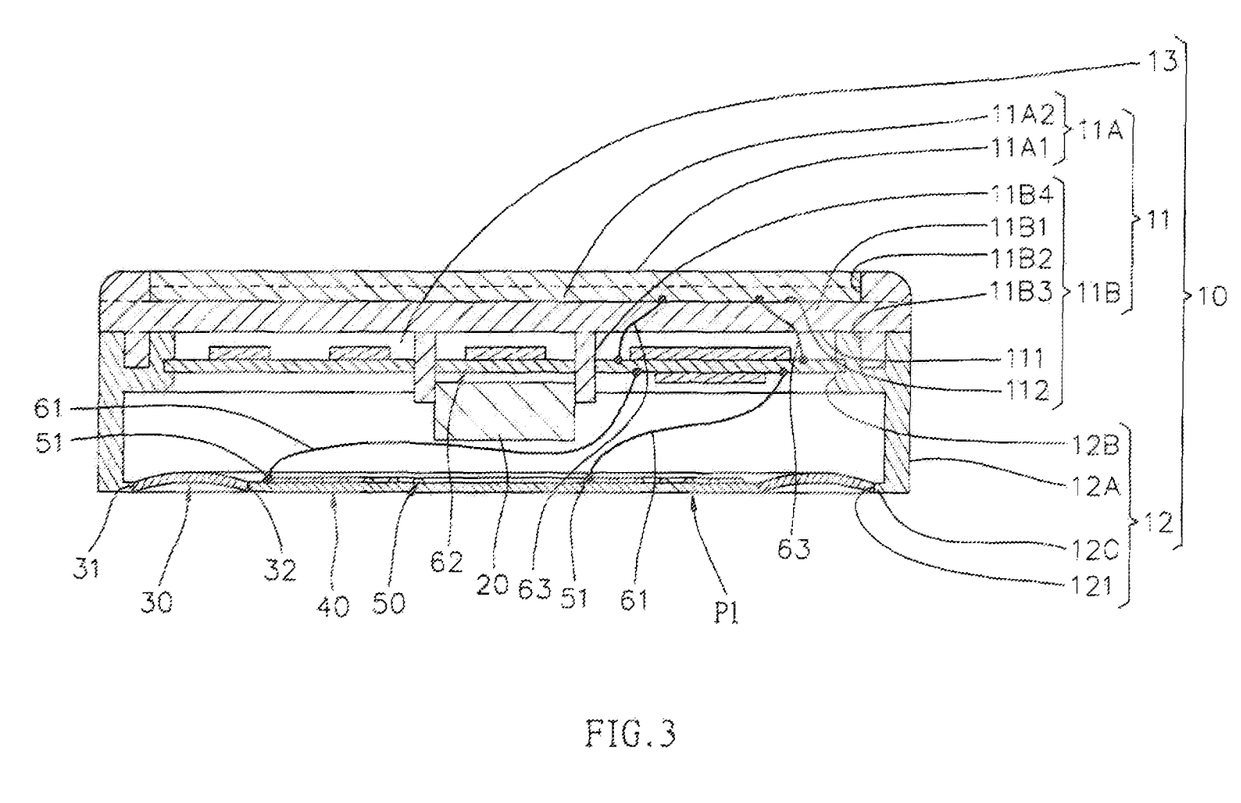
FIG. 3 is a cross-sectional view of the present invention when there is no alternating current is inputted.

Referring to FIGS. 1, 2 and 3, the present invention relates to a transducer. This transducer mainly comprises a housing unit 10, a magnet unit 20, an elastic diaphragm 30, a vibrating unit 40, and a coil 50.

Housing unit 10 is a substantially square hollow box structure and has a first housing 11 and a second housing 12. The first housing 11 and the second housing 12 are connected together so as to form a hollow structure having a storing space 13.

With regard to the first housing 11, it includes a touch panel 11A (ex. a smart phone with touch panel) and a frame 11B for securing and assembling the touch panel 11A. The touch panel 11A is roughly shaped as a rectangular plate and has a touching layer 11A1 and a displaying layer 11A2. The touching layer 11A1 is provided for touch input operation. The displaying layer 11A2 is provided for showing out information inputted (by the user) via the touching layer 11A and receiving signals generated from the touch input operation. The frame 11B is substantially square and has a plate portion 11B, a sidewall 11B2 upwardly extending from a periphery of the plate 11B1, an outer protrusion 11B3 downwardly extending from a periphery of the plate 11B1, an inner protrusion 11B4 downwardly extending from an inner portion of the plate 11B1.

Plate 11B1 of the first housing 11 includes the first inner surface 111 and the first outer surface 112 that are positioned on an upper side and a lower side of the plate 11B1. In addition, the first outer surface 112 and the sidewall 11B2 defines a space for storing and securing the touch panel 11A.

With reference to the second housing 12, it includes an outer frame 12A, an inner frame 12B inwardly extending from an upper side of the outer frame 12A, and a protruded edge 12C inwardly and horizontally extending from a lower side of the outer frame 12A. The outer frame 12A and the inner frame 12B forms an insert slot for allowing the outer protrusion 11B3 of the frame 11B inserting in so as to assemble the first housing 11 and the second housing 12 together. Furthermore, the second housing 12 has an opening 121 formed on the protrusion edge 12C.

Concerning this magnet unit 20, it is mounted on the first inner surface 111 of the housing 11.

Regarding this elastic diaphragm 30 that is roughly a thin layer (such as an annular thin layer), it has an outer edge 31 and an inner edge 32. The outer edge 31 is secured on the opening 121 of the second housing 12.

The vibrating unit 40 is secured on the inner edge 32 of the elastic diaphragm 30.

About the coil 50, it is secured on the vibrating unit 40. The coil 50 has two electric connecting points 51 for inputting an electric signal.

Therefore, when the electric signal is alternating current, the coil 50 generates continuous vibration caused by alternating attraction/repelling force of the magnet unit 20. When the electric signal is electric signal having frequency between 20~20000 Hz, the elastic diaphragm 40 generates sound signals within earshot (that are audible to humans). And, when the electric signal is electric signal having frequency between 10~20 Hz, the elastic diaphragm 40 generates vibration signals.

Figure 4:
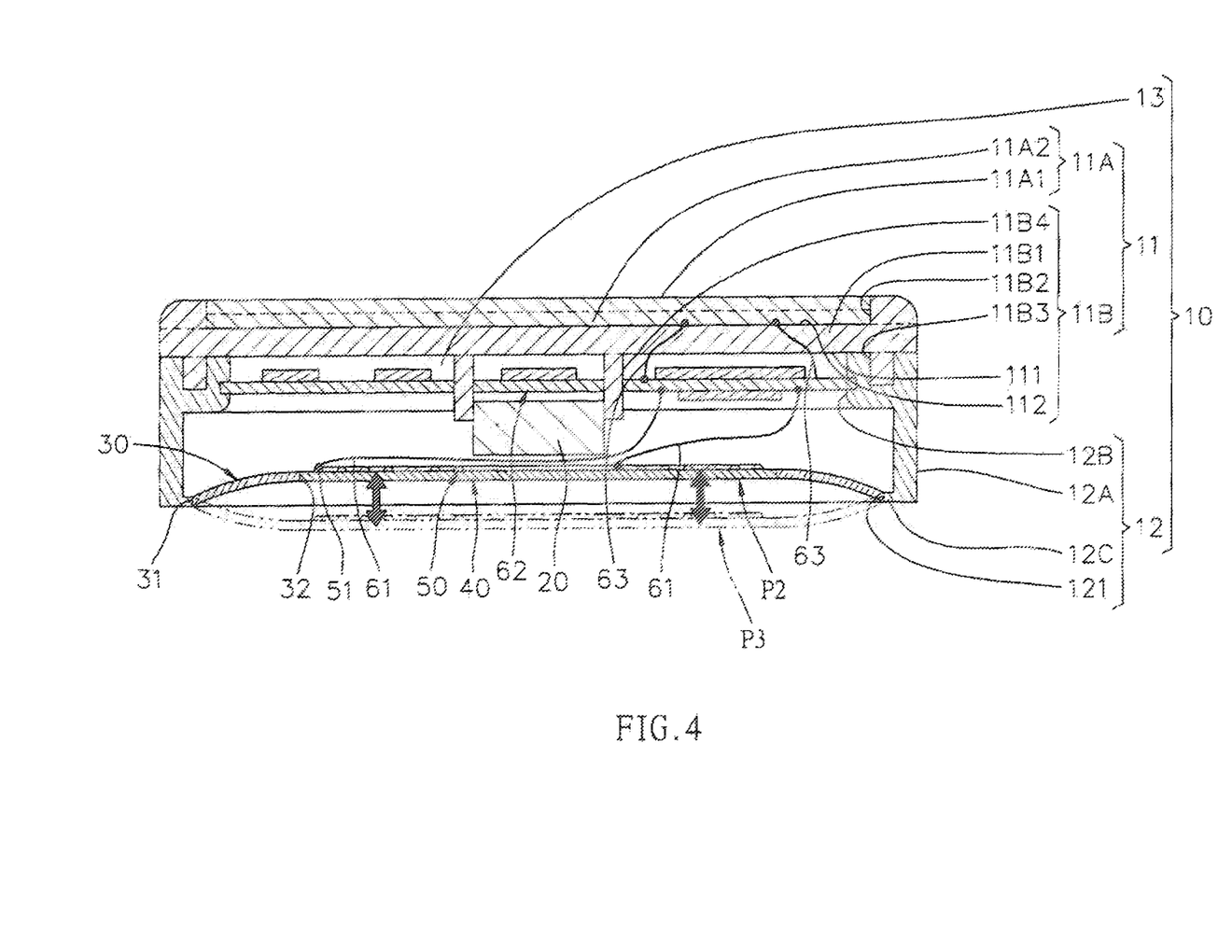
FIG. 4 is a cross-sectional view of the present invention when the alternating current is applied.
Figure 5:
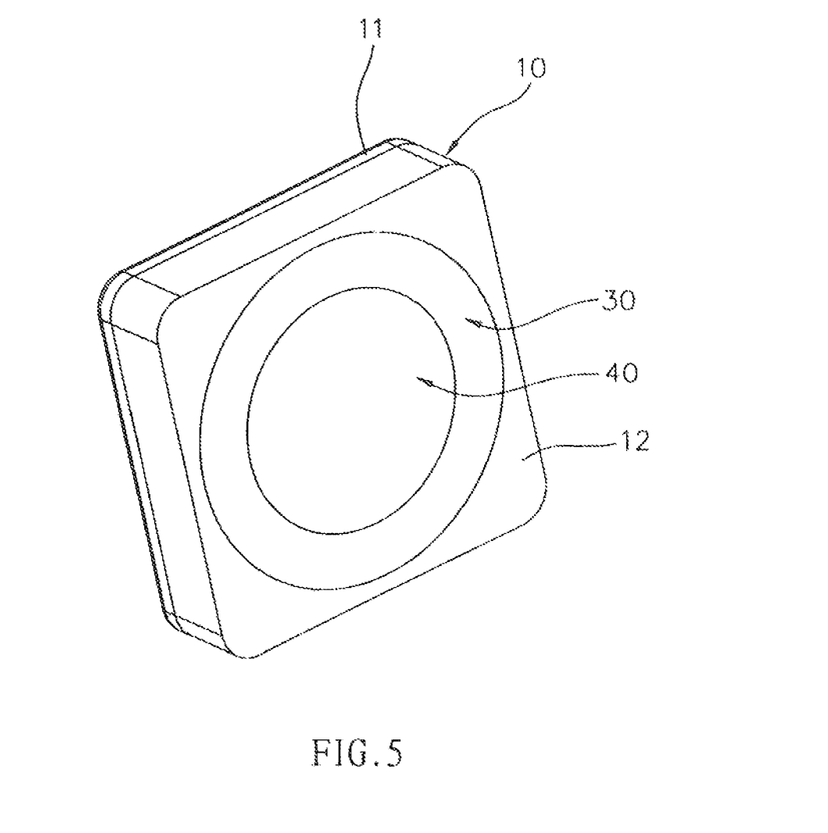
FIG. 5 is another perspective view of the present invention.

Moreover, as illustrated in FIG. 3, when no electric signal is inputted, the vibrating unit 40 does not vibrate. It is positioned at a first position P1. When the electric signal is alternating current, the coil 50 generates continuous vibration caused by alternating attraction/repelling force of the magnet unit 20. That is, it will vibrate between a second position P2 and a third position P3 as shown in FIG. 4.

The inner protrusion 11B4 downwardly extending from a periphery of the plate 11B1 can be shaped as a round magnet holding recess.

Accordingly, the magnetic unit 20 can be cylindrical and secured into the round magnet holding recess. It is disposed between the plate 11B1 and the vibrating unit 40. Besides, a proper gap (or distance) between the magnetic unit 20 and the elastic diaphragm 40 should be kept which could be a repeated vibration space.

Of course, the magnet unit 20 can be secured on the first inner surface 111 in many other ways, such as glue, welding, interlocking, fitting, etc.

With regard to material of the first housing 11 and the second housing 12 of the housing unit 10, polycarbonate (briefly called PC) or Acrylonitrile-Butadiene-Styrene (briefly called ABS resin) can be used.

The second housing 12 could be a shallow recessed structure. The first housing 11 can be a thin plate so that the first housing 11 and the second housing 12 can be combined together to form a storing space 13 which is isolated.

The elastic diaphragm 30 can be an annular structure with a curved cross-sectional area. However, it can be modified into another kind of cross-sectional area like wave-shaped, straight, or other shapes. Also, the elastic diaphragm 30 is provided for connecting the second housing 12 (more specifically the opening 121) with the vibrating unit 40. The material of the elastic diaphragm 30 can be silicone (which is polymerized siloxanes or polysiloxanes) or the like. Further, the function of the elastic diaphragm 30 is to allow a relative movement being generated between the second housing 12 and the vibrating unit 40 (for generating vibration and/or sound).

This vibrating unit 40 is positioned at the central portion of the elastic diaphragm 30. The material of the vibrating unit 40 can be polycarbonate (PC) or Acrylonitrile-Butadiene-Styrene (ABS resin) for generating vibration and/or sound.

The coil 50 is spiral. This coil 50 is disposed on the vibrating unit 40 and is positioned within the storing space 13. This coil 50 is a coiled wire having a starting point and an ending point where two electric connecting points 51 are located at.

Moreover, this invention may further include two electric wires 61, a signal generator 62 and two (or more) touch panel wires 63.

About the two electric wires 61 and the signal generator 62 (for example a controlling circuit board), one end of each electric wire 61 connects with the signal generator 62 (including the sound signal generator and the vibration signal generator). The other end of each electric wire 61 connects with the electric connecting point 51 for inputting the electric signal.

The signal generator 62 is disposed in the storing space 13 and engages with the inner frame 12B as well as inserts into the inner protrusion 11B4.

The magnet unit 20 is disposed between vibrating unit 40 and the signal generator 62.

Concerning these touch panel wires 63, one end of the touch panel wires 63 connects with the touch panel 11A. The other end of the touch panel wire 63 connects with the signal generator 62.

Thus, both the signal generated from the touching layer 11A1 and the image information from the displaying layer 11A2 can be transmitted through the touch panel wires 63 so as to allow signal transmitting between the touch panel 11A and the signal generator 62.

In summary, advantages and functions in accordance with this invention can be listed below.

Signal unit can produce sound and vibration. By utilizing the periphery of the vibration unit connecting with the elastic diaphragm as well as cooperating with the coil and the magnet unit, when alternating current with a predetermined frequency is supplied, it is able to generate sound or vibration. Or, both sound and vibration can be generated by one signal unit simultaneously.

It saves space for effectuating the thickness minimization of a product. This invention successfully replaces the traditional speaker and the vibration motor. Hence, it can save space and makes it easier to design an integral housing for a handheld electronic product. So, it saves space for effectuating the thickness minimization of a product. Particularly, the speaker of a traditional handheld electronic product is disposed within the earphone. Under this condition, this invention combines the earphone, speaker and the vibration motor into one integral unit.

While this invention has been particularly shown and described with references to the preferred embodiments thereof, it will be understood by those skilled in the art that various changes or modifications can be made therein without departing from the scope of the invention by the appended claims.

What is claimed is:
1. A transducer comprising:
a housing unit having:

a first housing including a touch panel and a frame for securing and assembling said touch panel, wherein said touch panel is shaped as a rectangular plate, said frame is substantially square and having a plate portion, a sidewall upwardly extending from a periphery of said plate portion, an outer protrusion downwardly extending from a periphery of said plate portion, an inner protrusion downwardly extending from an inner portion of said plate portion; and a second housing including an outer frame, an inner frame inwardly extending from an upper side of said outer frame, a protruded edge inwardly and horizontally extending from a lower side of said outer frame, said first housing and said second housing being connected together so as to form a hollow structure having a storing space, said first housing having a first inner surface and a first outer surface, said second housing having an opening formed on said protruded edge;

wherein said first inner surface and said first outer surface are both sides of said plate portion; and wherein said first outer surface and said sidewall defining a space for storing and securing said touch panel, wherein said outer frame and said inner frame forming an insert slot for allowing said outer protrusion of said frame inserting in so as to assemble said first housing and said second housing together;

a magnet unit being mounted on said first inner surface of said first housing;

an elastic diaphragm having an outer edge and an inner edge; said outer edge being secured on said opening of said second housing;

a vibrating unit being secured on said inner edge of said elastic diaphragm; and a coil being secured on said vibrating unit, said coil having two electric connecting points for inputting an electric signal.

2. The transducer of claim 1, wherein said electric signal includes at least one of a group consisting of alternating current, electric signal having frequency between 20-20000 Hz, and electric signal having frequency between 10-20 Hz;

when said electric signal is an alternating current, said coil generating continuous vibration caused by alternating attraction/repelling force of said magnet unit;

when said electric signal is an electric signal having a frequency between 20-20000 Hz, said elastic diaphragm generating sound signals within earshot;

when said electric signal is an electric signal having a frequency between 10-20 Hz, said elastic diaphragm generating vibration signals.

3. The transducer of claim 1, wherein said housing unit being shaped as a substantially square box structure.

4. The transducer of claim 1, wherein said inner protrusion downwardly extending from a periphery of the plate being shaped as a round magnet holding recess;

said magnetic unit being cylindrical and secured into the round magnet holding recess.

5. The transducer of claim 1, wherein said second housing being a shallow recessed structure;

said first housing being a thin plate so that said second housing and said first housing can be combined together to form said storing space which is isolated.

6. The transducer of claim 1, wherein said coil being spiral; said coil having a starting point and an ending point connecting with said two electric connecting points respectively.

7. The transducer of claim 6, further includes two electric wires and a signal generator; one end of each electric wire connecting with said signal generator;

the other end of each electric wire connecting with said electric connecting point for inputting the electric signal;

said signal generator being disposed in said storing space.

8. The transducer of claim 6, further including:

a plurality of touch panel wires, one end of the touch panel wires connecting with a touch panel;

the other end of said touch panel wire connecting with a signal generator so as to allow signal transmitting therebetween.

9. A transducer comprising:

a housing unit having a first housing and a second housing, said first housing and said second housing being connected together so as to form a hollow structure having a storing space, said first housing having a first inner surface and a first outer surface, said second housing having an opening;

a magnet unit being mounted on said first inner surface of said first housing;

an elastic diaphragm having an outer edge and an inner edge; said outer edge being secured on said opening of said second housing;

a vibrating unit being secured on said inner edge of said elastic diaphragm;

a coil being secured on said vibrating unit, said coil being spiral and having two electric connecting points for inputting an electric signal and a starting point and an ending point connecting with said two electric connecting points respectively;

two electric wires; and a signal generator being disposed in said storing space;

wherein one end of each electric wire connecting with said signal generator and the other end of each electric wire connecting with said electric connecting point for inputting the electric signal.

10. The transducer of claim 9, further including:

a plurality of touch panel wires, one end of the touch panel wires connecting with a touch panel, the other end of said touch panel wires connecting with the signal generator so as to allow signal transmitting therebetween.

11. The transducer of claim 9, wherein said first housing includes a touch panel and a frame for securing and assembling said touch panel, said touch panel being shaped as a rectangular plate;

said frame being substantially square and having a plate portion, a sidewall upwardly extending from a periphery of said plate portion, an outer protrusion downwardly extending from a periphery of said plate portion, an inner protrusion downwardly extending from an inner portion of said plate portion;

said first inner surface and said first outer surface being both sides of said plate portion; said first outer surface and said sidewall defining a space for storing and securing said touch panel.

12. The transducer of claim 11, wherein said second housing includes an outer frame, an inner frame inwardly extending from an upper side of said outer frame, and a protruded edge inwardly and horizontally extending from a lower side of said outer frame;

said outer frame and said inner frame forming an insert slot for allowing said outer protrusion of said frame inserting in so as to assemble said first housing and said second housing together;

said second housing having an opening formed on said protruded edge.

13. The transducer of claim 9, wherein said electric signal includes at least one of a group consisting of alternating current, electric signal having frequency between 20-20000 Hz, and electric signal having frequency between 10-20 Hz;
   when said electric signal is an alternating current, said coil generating continuous vibration caused by alternating attraction/repelling force of said magnet unit;
   when said electric signal is an electric signal having a frequency between 20-20000 Hz, said elastic diaphragm generating sound signals within earshot;
   when said electric signal is an electric signal having a frequency between 10-20 Hz, said elastic diaphragm generating vibration signals.

14. A transducer comprising:
   a housing unit having a first housing and a second housing, said first housing and said second housing being connected together so as to form a hollow structure having a storing space, said first housing having a first inner surface and a first outer surface, said second housing having an opening;
   a magnet unit being mounted on said first inner surface of said first housing;
   an elastic diaphragm having an outer edge and an inner edge; said outer edge being secured on said opening of said second housing;
   a vibrating unit being secured on said inner edge of said elastic diaphragm;
   a coil being secured on said vibrating unit, said coil being spiral and having two electric connecting points for inputting an electric signal and a starting point and an ending point connecting with said two electric connecting points respectively;
   a plurality of touch panel wires, one end of the touch panel wires connecting with a touch panel, the other end of said touch panel wires connecting with a signal generator so as to allow signal transmitting therebetween.

15. The transducer of claim 14, further includes two electric wires, one end of each electric wire connecting with said signal generator, the other end of each electric wire connecting with said electric connecting point for inputting the electric signal; said signal generator being disposed in said storing space.

16. The transducer of claim 14, wherein said first housing includes a touch panel and a frame for securing and assembling said touch panel, said touch panel being shaped as a rectangular plate;
   said frame being substantially square and having a plate portion, a sidewall upwardly extending from a periphery of said plate portion, an outer protrusion downwardly extending from a periphery of said plate portion, an inner protrusion downwardly extending from an inner portion of said plate portion;
   said first inner surface and said first outer surface being both sides of said plate portion; said first outer surface and said sidewall defining a space for storing and securing said touch panel.

17. The transducer of claim 16, wherein said second housing includes an outer frame, an inner frame inwardly extending from an upper side of said outer frame, and a protruded edge inwardly and horizontally extending from a lower side of said outer frame;
   said outer frame and said inner frame forming an insert slot for allowing said outer protrusion of said frame inserting in so as to assemble said first housing and said second housing together;
   said second housing having an opening formed on said protruded edge.

18. The transducer of claim 14, wherein said electric signal includes at least one of a group consisting of alternating current, electric signal having frequency between 20-20000 Hz, and electric signal having frequency between 10-20 Hz;
   when said electric signal is an alternating current, said coil generating continuous vibration caused by alternating attraction/repelling force of said magnet unit;
   when said electric signal is an electric signal having a frequency between 20-20000 Hz, said elastic diaphragm generating sound signals within earshot;
   when said electric signal is an electric signal having a frequency between 10-20 Hz, said elastic diaphragm generating vibration signals.

\* \* \* \* \*